E. VANDERVEER, Jr.
Potato-Digger.

No. 164,236.

Patented June 8, 1875.

UNITED STATES PATENT OFFICE.

ELIAS VANDERVEER, JR., OF MANOLAPAN, NEW JERSEY.

IMPROVEMENT IN POTATO-DIGGERS.

Specification forming part of Letters Patent No. 164,236, dated June 8, 1875; application filed October 12, 1874.

*To all whom it may concern:*

Be it known that I, ELIAS VANDERVEER, Jr., of Manolapan, Monmouth county, New Jersey, have invented an Improved Potato-Digger; and I do hereby declare the following to be a full and correct description of the same, reference being had to the accompanying drawings, in which—

Figure 1:
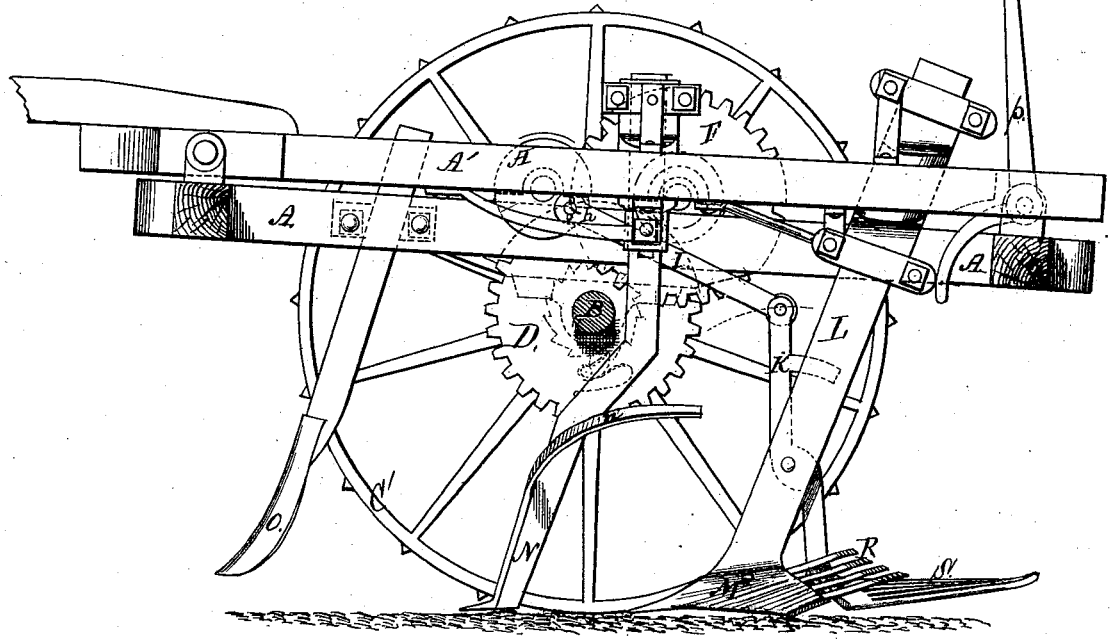
Figure 2:
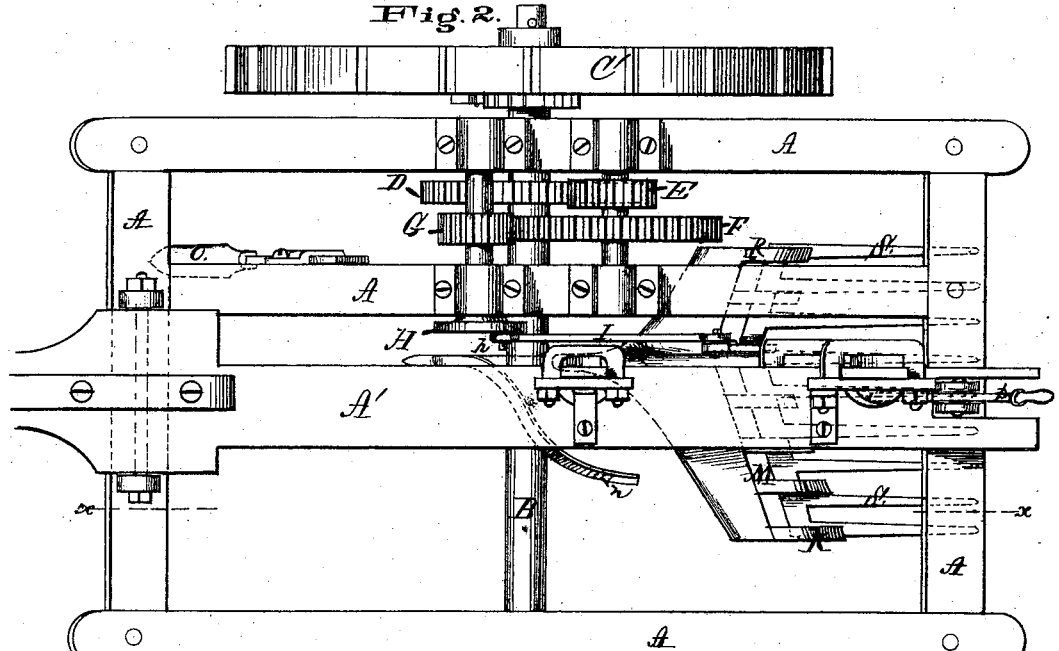

Figure 1 is a sectional view of my potato-digger taken on the line of x, Fig. 2; and Fig. 2 is a top view.

My invention relates to an improvement in potato-diggers, and consists in attaching to the rear of the digger, to operate in connection with the sifting-bars attached to the shovel or share, a series of vertically-vibrating sifting-bars, to more effectually separate the potatoes from the earth, and also in attaching to the front of the digger colters and shares arranged to remove the weeds and vines from the path of the digger.

In the drawings, A represents the frame of my digger, on the under side of which are the bearings of the shaft or axle B. On the outer ends of the shaft are the driving-wheels C C', made to rotate freely backwardly, but communicate their motion to the shaft B forwardly, by means of pawls and ratchets, in the usual manner. The shaft B, in its revolution, carries with it a cog-wheel, D, placed near the driving-wheel C'. This cog-wheel D communicates its motion to a pinion, E, which has its bearings upon the top of the frame A. Upon the shaft of the pinion E is a cog-wheel, F, gearing with another pinion, G, upon another shaft upon the top of the frame A. Upon the inner end of the shaft of the pinion G is a disk, H, and wrist-pin *h*. Upon the wrist-pin *h* is a pitman, I, communicating its reciprocating motion to the upper end of the lever K pivoted to the standard of the plow. To the lower end of the lever K is a horizontal rake or series of bars, S, to which is communicated, by means of the gearing and lever above described, a vertical reciprocating motion. Upon a portion, A', of the frame, and made adjustable vertically by means of cuffs and clevises, is the standard L of the plow or shovel M. This plow has a share-point in front, with a share-edge running backwardly from both sides of the point, the land-side being the shorter. Upon the rear of the plow are stationary bars R running backwardly, and a little elevated. Upon the same cross-piece A' of the frame A, and similarly adjustable vertically, is placed a colter, N. Said colter is immediately in front of the point of the share, and removes all obstructions to the passage of the plow. Upon the front of the colter N, and inclining from the land-side of the digger, is a curved arm, *n*, for the purpose of guiding the weeds and vines beyond the path of the plow, and out of the way of the potatoes already dug. Still in advance of the colter N, and nearer to the land-side of the digger, is a colter, O, secured adjustably to the frame A. The part of the frame A' to which the plow-standard L and colter N are attached is pivoted to the frame A in front, and can be raised in the rear by means of a hand-lever, *p*, thus enabling the driver to raise the plow and colter N out of the ground, if it should be necessary to do so.

The operation of my potato-digger is as follows: Locomotive-power having been applied to the frame, the driving-wheels communicate their revolving motion, by means of the gearing already described, to the disk H, and from thence a rapid vertical reciprocating motion is communicated to the rake or sifter S. This sifter operates immediately in connection with and between the back-bars R of the plow. The plow is so constructed as to run under the potatoes in the ground, and raise them to the surface upon the bars R, where much of the dirt is separated from them, but they are forced to fall upon the rapidly-reciprocating bars S, and here they are almost entirely freed from adhering dirt. To rid the digger from the weeds and vines the colter N, with its side guide *n*, and the forward colter O occupying a position upon the land-side of the digger, make a diagonal guide or path for the weeds and vines, leaving the plow and shaking bars clear.

In practice this digger is found to be compact and simple in construction.

Having thus fully described my invention, what I claim, and desire to secure by Letters Patent, is—

1. In combination with the potato-plow M, having rear sifter-bars, the vertically-reciprocating sifter-bars S, substantially as described.

2. The pitman I, pivoted lever K, standard L, and sifter S, in combination with the plow M and rear sifter-bars R, substantially as described.

3. The potato-plow M, in combination with the colter N, having a side arm, $n$, and forward colter O, all arranged as and for the purpose substantially as described.

4. The combination of the potato-plow M, having sifting-bars R, colter N, and arm $n$, colter O, and vertical shaker S, substantially as described.

The above specification of my said invention signed and witnessed at Freehold, this 1st day of October, A. D. 1874.

ELIAS VANDERVEER, JR.

Witnesses:
 A. W. ARROWSMITH,
 JAS. S. ARROWSMITH.